United States Patent [19]
Lenherr et al.

[11] Patent Number: 5,501,559
[45] Date of Patent: Mar. 26, 1996

[54] SCREW CONNECTION FOR JOINING TWO COMPONENTS

[75] Inventors: Harald Lenherr, Beringen, Switzerland; Franz Strohner, Büsingen, Germany

[73] Assignee: SIG Schweizerische Industrie-Gesellschaft, Neuhausen am Rheinfall, Switzerland

[21] Appl. No.: 311,673

[22] Filed: Sep. 23, 1994

[30] Foreign Application Priority Data

Oct. 1, 1993 [CH] Switzerland ............ 2958/93

[51] Int. Cl.⁶ ............ F16B 19/00; F16B 33/00
[52] U.S. Cl. ............ 411/373; 411/431; 411/910
[58] Field of Search ............ 411/371, 372, 411/373, 377, 429, 431, 910

[56] References Cited

U.S. PATENT DOCUMENTS

| | | | |
|---|---|---|---|
| 264,776 | 9/1882 | Sharp | 411/373 |
| 3,065,662 | 11/1962 | Spoehr et al. | |
| 3,405,595 | 10/1968 | Peterson | 411/373 X |
| 4,394,096 | 7/1983 | Stevens | 411/910 X |
| 4,621,230 | 11/1986 | Crouch et al. | 411/373 X |

FOREIGN PATENT DOCUMENTS

| | | |
|---|---|---|
| 8716807 | 2/1988 | Germany . |
| 3701574 | 8/1988 | Germany . |
| 925314 | 5/1963 | United Kingdom . |

*Primary Examiner*—Neill R. Wilson
*Attorney, Agent, or Firm*—Spencer & Frank

[57] ABSTRACT

A screw connection includes a first component having an outer surface and a countersunk bore extending from the surface and having a cylindrical portion adjoining the outer surface of the first component. There is further provided a second component adjoining the first component. A screw passes through the countersunk bore and extends into the second component for joining together the first and second components. The screw includes a screw head having an end face which is recessed relative to the outer surface. A disk is press-fitted into the cylindrical portion of the countersunk bore. The disk has a surface oriented toward the end face of the screw head. The disk surface has a center part which is in direct or indirect contact with the end face of the screw head. A circumferential marginal part of the disk is at a clearance from the end face of the screw head whereby an externally applied pressing force on the disk at a disk location spaced from the center part causes a rocking motion of the disk.

14 Claims, 1 Drawing Sheet

SCREW CONNECTION FOR JOINING TWO COMPONENTS

CROSS REFERENCE TO RELATED APPLICATION

This application claims the priority of Swiss Application No. 2958/93-6 filed Oct. 1, 1993, which is incorporated herein by reference.

BACKGROUND OF THE INVENTION

This invention relates to a screw for joining together a first and a second component. The screw has a head which is recessed in a countersunk bore of the first component. Such a conventional screw connection has the disadvantage that the parts of the screw head which serve to be engaged by a torque-transmitting tool, such as a screwdriver or wrench are often filled with foreign bodies such as dirt, paint or the like which renders a release (unscrewing) of the screw difficult and in some applications may be hygienically objectionable.

SUMMARY OF THE INVENTION

It is an object of the invention to provide an improved screw connection of the above-outlined type from which the discussed disadvantages are eliminated.

This object and others to become apparent as the specification progresses, are accomplished by the invention, according to which, briefly stated, the outer end face of the screw head is in a recessed position relative to an outer surface of the first component and further, a countersunk bore portion provided in the first component has a cylindrical part into which, above the screw head, a disk is pressed which, at its mid portion, directly or indirectly contacts the end face of the screw head while at its circumferential marginal zones it is situated at a distance from such end face.

By virtue of the pressed-in disk the screw head is protected from soiling. Since the marginal circumferential zone of the disk is at a distance from the screw head, the disk may be at its edge unilaterally pushed in by means of a tool, such as a screwdriver, causing a rocking motion of the disk as it fulcrumates about the point of contact with the end face of the screw head. Thereafter, the disk may be removed in a simple manner. By virtue of the invention, the screw head remains clean and thus the screw may be easily turned.

DESCRIPTION OF THE PREFERRED EMBODIMENTS

Figure 1:
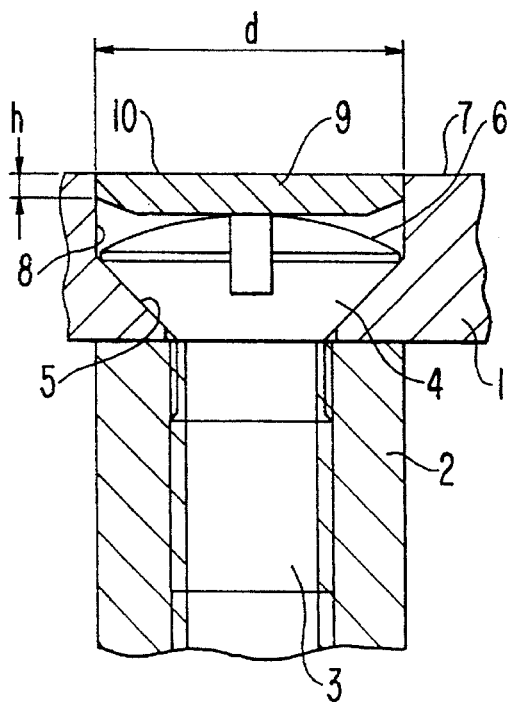
FIGS. 1, 2, 3 and 4 are axial sectional views of four preferred embodiments of the invention.

Turning to FIG. 1, the screw connection shown therein includes two components 1 and 2 joined together by a countersunk screw 3 having a generally lens-shaped head 4. The head 4 of the screw 3 is recessed into a countersunk bore 5 of the component 1. The outer face (end face) 6 of the head 4 is recessed with respect to the upper outer surface 7 of the component 1. The countersunk bore 5 has a cylindrical portion 8 adjoining the outer surface 7.

A circular disk 9 is press-fitted into the bore portion 8 and contacts the middle of the end face 6, while the circumferential marginal zone of the circular disk 9 is at a distance from the end face 6 of the screw head 4. The outer (upper) surface 10 of the disk 9 is flush with the outer (upper) surface 7 of the component 1. The diameter d of the disk 9 is at least ten times its thickness h, measured at the cylindrical periphery of the disk 9.

By virtue of the above-described arrangement the disk 9 may be, at one point close to its periphery pushed inwardly by a tool, as a result of which the disk 9 will rock about the contact point with the screw head 4, and that edge portion of the disk 9 which is diametrically opposite to the location where the disk was pressed in, will rise beyond the surface 7 of the component 1. The disk 9 thus assumes an oblique position from which it may be easily entirely removed from the bore hole 5, exposing the screw head for engagement by a torque-applying tool, such as a screwdriver. The disk 9 may be made of a metal, such as aluminum or a synthetic material. The disk 9 may be of a color different from that of the upper surface of the component 1 for easy identification which may be convenient particularly in case of large components.

Figure 2:
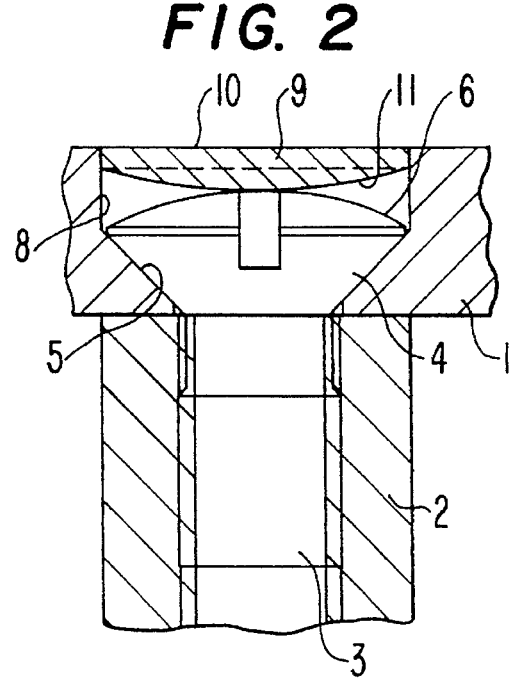

The embodiment according to FIG. 2 differs from that described in connection with FIG. 1 in that the underface 11 of the disk 9 is of convex configuration. This ensures that even if the screw head has a planar face, rocking of the disk 9 about its contact location with the screw head will occur upon depression of the disk at a location at its periphery.

Figure 3:
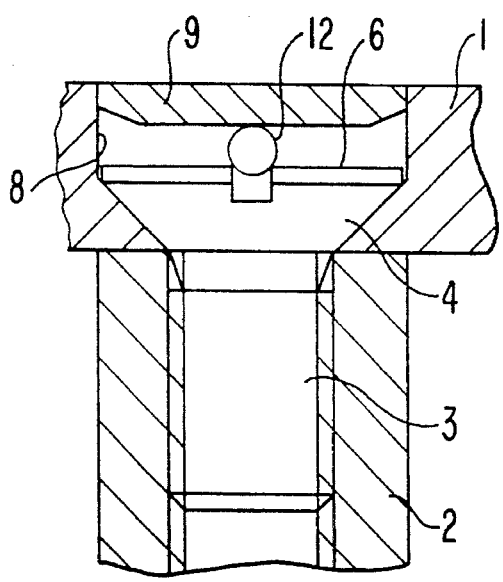

In the embodiment illustrated in FIG. 3, the underface of the disk 9 (similarly to the configuration in FIG. 1) and the upper face of the screw head 4 have a planar, parallel-oriented configuration. Between the screw head 4 and the disk 9 an intermediate member such as a sphere 12 is inserted to ensure the above-described rocking motion of the disk 9. Advantageously, the sphere 12 is partially received (cradled) in the tool-receiving slot provided in the screw head 4. As an alternative, instead of a sphere a cylindrical pin may be used, which lies lengthwise in the slot of the screw head and radially projects beyond the end face thereof.

Figure 4:
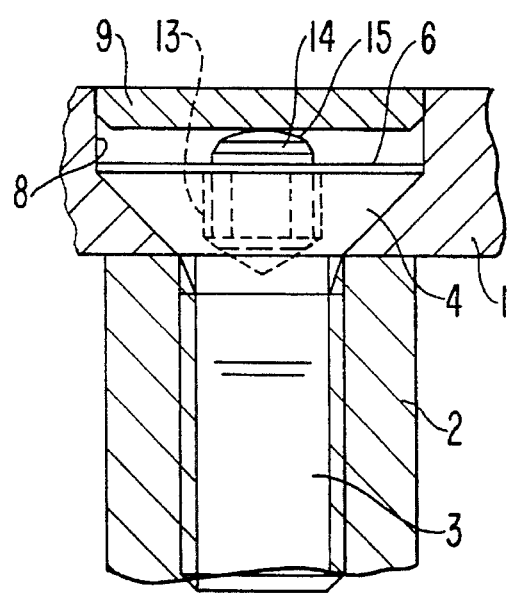

According to the embodiment illustrated in FIG. 4, the screw 3 has a central hexagonal recess 13 for engagement by an allen wrench. A cylindrical pin 14 having a convex end face is positioned in the hexagonal recess 13, projecting beyond the end face 6 of the screw head 4. It is to be understood that in case of a screw with a hexagonal recess, instead of a conical countersunk portion a throughout cylindrical countersunk portion is provided.

It will be understood that the above description of the present invention is susceptible to various modifications, changes and adaptations, and the same are intended to be comprehended within the meaning and range of equivalents of the appended claims.

What is claimed is:

1. A screw connection comprising
   (a) a first component having
      (1) an outer surface; and
      (2) a countersunk bore extending from said surface and having a cylindrical portion adjoining said outer surface;
   (b) a second component adjoining said first component;
   (c) a screw passing through said countersunk bore and extending into said second component for joining together said first and second components; said screw including a screw head having an end face being recessed relative to said outer surface; said end face having a tool-receiving part; and
   (d) a disk press-fitted into said cylindrical portion; said disk having a surface oriented toward said end face; said surface of said disk further having a center part being in one of a direct and indirect contact with said end face and a circumferential marginal part being at a clearance from said end face; said clearance being of sufficient dimensions for allowing an angular displacement of said disk about said contact, whereby an externally applied pressing force on said disk at a disk location spaced from said center part causes a rocking motion of said disk.

2. The screw connection as defined in claim 1, wherein said center part is in a direct contact with said end face.

3. The screw connection as defined in claim 1, wherein said disk is of metal.

4. The screw connection as defined in claim 1, wherein said disk is a plastic material.

5. The screw connection as defined in claim 1, wherein a diameter of said disk is more than ten times greater than a thickness of said disk measured at a periphery thereof.

6. The screw connection as defined in claim 1, wherein said surface of said disk is a first, inner disk surface; further comprising a second, outer disk surface being flush with said surface of said first member.

7. The screw connection as defined in claim 1, wherein said surface of said disk is a first, inner disk surface; further comprising a second, outer disk surface; the second disk surface having a color different from a color of said outer surface of said first member.

8. The screw connection as defined in claim 1, wherein said surface of said disk is convex.

9. The screw connection as defined in claim 1, wherein said center part is in an indirect contact with said end face.

10. The screw connection as defined in claim 9, further comprising an intermediate member disposed between and being in contact with said end face and said center part.

11. The screw connection as defined in claim 10, wherein said intermediate member is a ball.

12. The screw connection as defined in claim 10, wherein said intermediate member is a cylindrical pin having an axis oriented parallel to said end face and said surface of said disk.

13. The screw connection as defined in claim 10, wherein said tool-receiving part is a hexagonal recess and said intermediate member is inserted into said hexagonal recess and projecting beyond said end face of said screw head and engaging said center part of said surface of said disk.

14. The screw connection as defined in claim 10, wherein said tool-receiving part of said screw head cradles said intermediate member.

* * * * *